United States Patent Office 2,723,268
Patented Nov. 8, 1955

2,723,268

PROCESS AND INTERMEDIATES FOR PREPARING 3-HYDROXY-N-METHYL MORPHINANE

Hans Henecka, Wuppertal-Elberfeld, Germany, assignor, by mesne assignments, to Farbenfabriken Bayer Aktiengesellschaft, Leverkusen-Bayerwerk, Germany No Drawing. Application January 22, 1953, Serial No. 332,777

Claims priority, application Germany January 30, 1952

12 Claims. (Cl. 260—285)

This invention relates generally to methods for the synthesis of organic chemical compounds useful in therapy and, more particularly, it is concerned with an improved process for making the morphine-like analgesic, 3-hydroxy-N-methylmorphinane, and with certain novel intermediate compounds produced and utilized in this improved process.

Methods heretofore employed for the manufacture of the valuable morphine-like analgesic, 3 - hydroxy - N - methylmorphinane, have been found to be very difficult to adapt to conditions for commercial production of the drug since they necessitate numerous steps and a number of the intermediate products are unstable and, therefore, difficult to store or utilize in desirably large quantities.

In accordance with this incention, it is now found that 3-hydroxy-N-methylmorphinane can be obtained in a simple and commercially practicable manner by a new sequence of reactions, necessitating merely two intermediate stages, by condensing cyclohexene - (1) - yl - ethylamine and a substance yielding a p-alkoxyphenyl-acetaldehyde in a dilute aqueous reaction medium at a hydrogen-ion concentration in the range of about pH 3 to about pH 4, to form 1-p-alkoxybenzyl-10-hydroxy-decahydroisoquinoline, forming the N-methyl dervative of this compound, for instance by treatment with formaldehyde and hydrogen in the presence of a hydrogenation catalyst, and cyclizing this corresponding 1-p-alkoxybenzyl-10-hydroxy-N-methyl compound to the desider 3-hydroxy-N-methylmorphinane by treatment with strong acids.

The new synthesis according to this invention is illustrated by the following equations, alkoxy here being methoxy:

The expression used above for defining one of the primary reactants as a substance yielding a p-alkoxyphenyl-acetaldehyde signifies such aldehyde derivatives as the alkali metal bisulfite addition products and also compounds that, under the reaction conditions, may decompose or otherwise be molecularly reconstituted to yield a p-alkoxyphenyl-acetaldehyde, especially such substances as p-alkoxyphenyl-glycide esters. These esters may be represented by the general formula, R being alkyl:

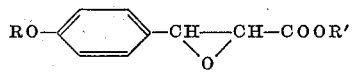

It is found, in accordance with this invention, that these esters, when in a dilute aqueous solution with cyclohexen-(1)-ethylamine, at a hydrogen ion concentration in the range of about pH 3 to about pH 4, undergo saponification and decarboxylation to yield the corresponding free p-alkoxyphenyl-acetaldehydes as intermediates. These reactions may be indicated as follows, using methyl p-methoxyphenyl-glycide ester as a typical example:

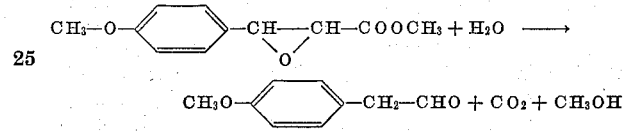

The conditions under which the primary reactants are condensed to form the 1-p-alkoxybenzyl-10-hydroxy-decahydroisoquinolines are not critical except in terms of the hydrogen ion concentration of the reaction mixture. This hydrogen ion concentration must be maintained within the range of pH 3 to about pH 4 if the formation of undesired resinous by-products is to be avoided. The use of concentrated acid as the reaction medium here yields no crystalline isoquinoline derivative.

The use of a para-alkoxy-phenyl-acetaldehyde alkali metal bisulfite addition product as a primary reactant gives satisfactory yields of the desired product but the preferred primary reactants for supplying the p-alkoxyphenyl-acetaldehyde reactant are the p-alkoxyphenyl-glycide esters (3 - p - alkoxyphenyl-2:3-epoxy-propionic esters). These esters are preferred for the reason that by their use it becomes unnecessary to synthesize the unstable p-alkoxyphenyl-acetaldehydes from which the

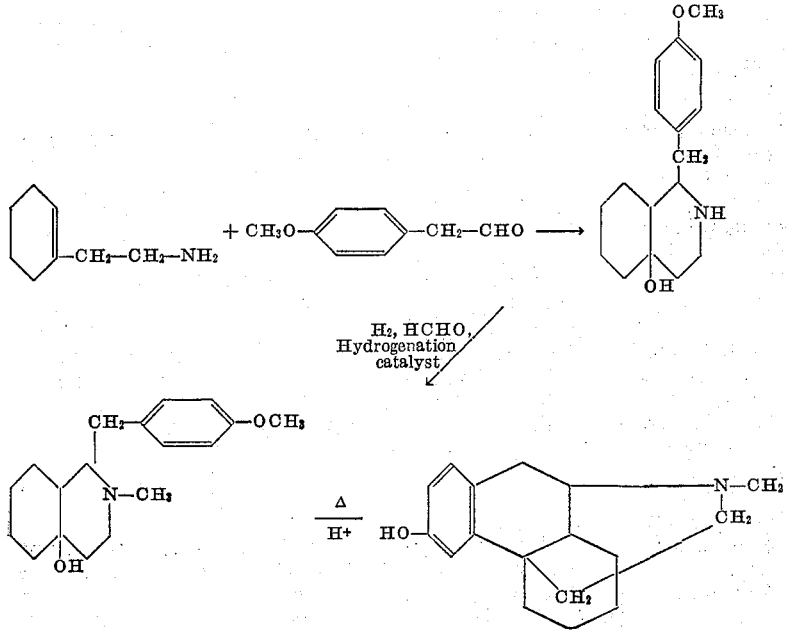

bisulfite products are obtained, thereby simplifying the process for synthesizing the desired final products. These p-alkoxyphenyl-glycide esters may be readily obtained by condensing a p-alkoxy-benzaldehyde with a chloro acetic ester in the presence of an alkali metal alcoholate.

The process of this invention is not limited merely to the production of 3-hydroxy-N-methylmorphinane, for it is within the scope of the invention to produce by this new process alkyl, aryl, hydroxy, aryloxy or halo derivatives of 3-hydroxy-N-methylmorphinane by utilization of suitably substituted primary reactants.

To facilitate a better understanding of the subject matter of this invention, several specific examples herewith follow, provided by way of illustration of the invention merely and not by way of limitation upon the invention.

*Example 1*

A solution of about 25 grams of cyclohexane-(1)-yl-ethylamine (0.20 mol) in 200 cubic centimeters of n-hydrochloric acid, which is diluted with water to 500 cubic centimeters, is added to a solution of 50 grams of p-methoxyphenyl-acetaldehyde sodium bisulfite addition product (0.197 mol) in 500 cubic centimeters of water. The mixture is heated on a water bath at 80° to 90° C., with stirring. The hydrogen ion concentration of the solution initially is about pH 3 to pH 4 but, as the condensation reaction proceeds, the pH value increases, for instance to about pH 5 to pH 6 after about one hour of heating, and, at this point, about 20 cubic centimeters of n-hydrochloric acid are added, followed by an equal quantity of n-hydrochloric acid after about 5 hours heating and another equal quantity again after about 30 hours. In this manner, the hydrogen ion concentration of the solution is kept within the range of about pH 3 to pH 4. After heating for about 45 hours, the solution is cooled, decanted from a small amount of a resinous by-product and clarified by shaking with ether, whereby the small remnant of acid-insoluble impurities is removed. Thereupon the base is set free by addition of potassium carbonate solution and immediately taken up with a large volume of ether, the ethereal solution is separated, washed with water and clarified by shaking with a saturated sodium chloride solution. The filtered etheral solution is then partially evaporated, yielding 1-p-methoxybenzyl-10-hydroxy-decahydroisoquinoline, which precipitates as a fine white crystalline mass. The mixture is cooled, filtered off and the reaction product is washed with a little ether. After recrystallizing from ethyl acetate, about 10 to 15 grams of glittering, colorless needles having a melting point of 152° C. are obtained.

Analysis:

Calculated: C 74.2%; H 9.08%; N 5.09%; $OCH_3$ 11.28%
Found:     C 73.94%; H 9.17%; N 5.09%; $OCH_3$ 11.35%

By methylation of this product in the usual manner, for instance, by hydrogenation in methanol solution in the presence of 1.1 mols of formaldehyde solution (30%) and a Raney nickel catalyst, 1-p-methoxybenzyl-N-methyl-10-hydroxy-decahydroisoquinoline is obtained as a highly viscous, colorless oil which boils at 160 to 165° C. under a pressure of 0.01 millimeters of mercury.

About 20 grams of this N-methyl-compound, dissolved in 200 cubic centimeters of constant boiling aqueous hydrobromic acid (ca. 48% HBr), is heated at its boiling point for 6 hours. Thereafter, excess hydrobromic acid is distilled off under vacuum at 60° C., the remaining sirup is dissolved in a little methanol, diluted with water, the resultant 3-hydroxy-N-methylmorphinane is precipitated with ammonia, and the initially amorphous base is quickly taken up in a large volume of ether. By concentrating this ethereal solution, a sirup, mixed with crystals, is obtained which solidifies to a crystalline mass on boiling with a little methanol. After cooling, the mixture is filtered off and the crystalline product, 3-hydroxy-N-methylmorphinane, thus obtained is recrystallized from methanol. It melts at 251° to 253° C. and the yield amounts to 30 to 40% of theory.

By fractional crystallization of the mother liquors obtained in the production of 3-hydroxy-N-methyl-morphinane as above described, the 3-hydroxy-N-methyl-morphinane isomer epimeric at $C_{14}$, and having a melting point of 198° to 200° C., is obtained. Its methyl ether has a melting point of 97° to 99° C. The yields of this epimeric product equals that of the 3-hydroxy-N-methyl-morphinane, having the melting point of 251° C., first recovered. The 3-hydroxy-N-methylmorphinane having the melting point of 251° C. corresponds sterically to the morphia alkaloids. It is more difficultly soluble in methanol than is the $C_{14}$ epimer.

If the 3-hydroxy-N-methylmorphinane is reacted with phenyl-trimethylammonium hydroxide in methanol in accordance with the process described in German Patent 247,180, 3-methoxy-N-methyl-morphinane is obtained in a nearly quantitative yield. The melting point of this product is 81° to 83° C. and the melting point of its hydrochloride is 245° to 247° C. By acetylation, for instance with acetic anhydride in pyridine, 3-hydroxy-N-methylmorphinane yields 3 - acetoxy - N - methylmorphinane as an oily product having a boiling point of 145° C. at a pressure of 0.01 millimeters of mercury.

*Example 2*

A solution of 25 grams of cyclohexane-(1)-yl-ethylamine (0.02 mol) in 300 cubic centimeters N-hydrochloric acid and 700 cubic centimeters of water is mixed with about 42 grams (0.202 mol) of methyl 3-(p-methoxyphenyl)-2:3-epoxy-propionate (boiling point, 151° at a pressure of 1.3 millimeters of mercury; melting point 60–62° C.; which may be obtained by condensing anise aldehyde with methyl chloroacetate in the presence of sodium methylate). The mixture is heated at 80° to 90° C. for about 45 to 48 hours, while stirring, until the slow evolution of gas, which starts soon after the heating is begun, has stopped. After cooling the solution, it is decanted from small portions of a resinous by-product, clarified by extraction with ether, and filtered. Potassium carbonate solution is added to the acid solution to liberate the free base which is at once extracted with a large volume of ether. The ether extract is separated, washed with water, clarified by agitating with a saturated sodium chloride solution, and concentrated by evaporation. The reaction product, 1-p-methoxybenzyl-10-hydroxy-decahydroisoquinoline, separates as a fine white crystalline mass which, after cooling is removed by filtration and washed with a little ether. After recrystallization from ethyl acetate, about 10 grams of glittering, colorless needles of the product, having a melting point of 152° C., are obtained.

*Example 3*

The process of either of the preceding examples is repeated with the cyclohexene-(1)-yl-ethylamine replaced by the equivalent amount of 4-methyl-cyclohexene-(1)-yl-ethylamine (boiling point at a pressure of 11.5 millimeters of mercury, 83° to 85° C.; melting point of the picrate, 192° C.; which may be prepared from 4-methyl-cyclohexanone by routine methods of synthesis), 1-p-methoxybenzyl-7-methyl-10 - hydroxy - decahydroisoquinoline is obtained, having a melting point of 148° C. after being recrystallized from ethyl acetate. The N-methyl derivative thereof, having a melting point of 104° C. after being recrystallized from ether/petroleum ether, is converted, by boiling with hydrobromic acid, into 3-hydroxy-N: 7-dimethylmorphinane, obtained as a mixture of the $C_7$ epimers, having a melting point of 233–243° C.

*Example 4*

About 465 grams of cyclohexene-(1)-yl-ethylamine (3.72 mol), 645 milliliters hydrochloric acid containing 22.37 grams of hydrogen chloride per 100 milliliters (3.95 mol), 19.5 liters of water and 774 grams of p- methoxyphenylglycidic acid methyl ester (3.72 mol; boiling point, 151° C. at a pressure of 1.3 millimeters of mercury; melting point 60° to 62° C.) are stirred at 80 to 90° C. until evolution of carbon dioxide ceases. After cooling, the mixture is decanted from a slight amount of resinous by-product, the colorless solution is clarified by treatment with some animal charcoal, and filtered. Some ether is added to the clear solution and the base is set free by addition of concentrated potassium carbonate solution. The precipitate, which is at first oily, solidifies after a short period of time as fine, nearly colorless crystals of crude 1-p-methoxybenzyl-10-hydroxy-decahydroisoquinoline which after standing for 2 hours, are removal by filtration under suction. The crystals are washed with water and a little ether, then dried. About 413 grams of the compound are thus obtained, corresponding to a yield of 40.3 percent of theory. After being recrystallized from dilute methanol, the compound melts at 152° C.

In the following claims, certain terms are used having specialized and limited significance defined as follows: A N-alkylating reagent is a reagent or combination of reagents, of which formaldehyde with hydrogen in the presence of a hydrogenation catalyst is one example cited above, and formaldehyde in the presence of formic acid is another, that may be used for introducing an alkyl group as a substituent of the nitrogen atom of the heterocyclic nucleus. The term also embraces alkylating agents, other than the two specifically mentioned, such as halogen alkyls or dialkylsulfates which, although much less satisfactory, may be used for this purpose. The term alkoxy signifies the lower members of the series merely, typified by the methoxy compounds, and comprising at most 4 carbon atoms in the chain. The meaning of the term alkali metal bisulfite is self evident: sodium bisulfite is representative of the class signified. The esters referred to are the lower alkyl esters, of which the methyl esters are typical. A mineral acid is one such as hydrobromic acid or phosphoric acid.

Having thus described the subject matter of this invention, what it is desired to secure by Letters Patent is:

1. Method of making a 3-hydroxy-N-alkylmorphinane that comprises forming a 1-p-alkoxybenzyl-10-hydroxy-decahydroisoquinoline by condensing a cyclohexene-(1)-yl-ethylamine with a substance chosen from the group consisting of 3-(p-alkoxyphenyl)-2:3-epoxypropionic acid esters and alkali metal bisulfite addition products of p-alkoxyphenylacetaldehyde, in a dilute aqueous medium at a hydrogen ion concentration within the range of about pH 3 to about pH 4, converting this condensation product to a 1-p-alkoxybenzyl-N-alkyl-10-hydroxy-decahydroisoquinoline by treatment with a N-alkylating reagent, and heating this product with an aqueous solution of a mineral acid under reflux to yield the desired 3-hydroxy-N-alkylmorphinane.

2. Method of making a 3-hydroxy-N-methylmorphinane that comprises forming a 1-p-alkoxybenzyl-10-hydroxy-decahydroisoquinoline by condensing a cyclohexene-(1)-yl-ethylamine with a substance chosen from the group consisting of 3-(p-alkoxyphenyl)-2:3-epoxypropionic acid esters and alkali metal bisulfite addition products of p-alkoxyphenylacetaldehyde, in a dilute aqueous medium at a hydrogen ion concentration within the range of about pH 3 to about pH 4, converting this condensation product to a 1-p-alkoxybenzyl-N-methyl-10-hydroxy-decahydroisoquinoline by treatment with a N-methylating reagent chosen from the group consisting of formaldehyde with hydrogen in the presence of a hydrogenation catalyst and formaldehyde in the presence of formic acid, and heating this product with an aqueous solution of a mineral acid under reflux to yield the desired 3-hydroxy-N-methylmorphinane.

3. Method of making 3-hydroxy-N-methylmorphinane that comprises forming a 1-p-methoxybenzyl-10-hydroxy-decahydroisoquinoline by condensing cyclohexene-(1)-yl-ethylamine with 3-(p-methoxyphenyl)-2:3-epoxypropionic acid methyl ester in a dilute aqueous medium at a hydrogen ion concentration within the range of about pH 3 to about pH 4, converting this condensation product to 1-p-methoxybenzyl-N-methyl-10-hydroxy-decahydroisoquinoline by treatment, while in methanol solution, with formaldehyde and hydrogen in the presence of a hydrogenation catalyst, and heating this product with aqueous hydrobromic acid under reflux to yield the desired 3-hydroxy-N-methylmorphinane.

4. Method of making 3-hydroxy-N-methylmorphinane that comprises forming a 1-p-methoxybenzyl-10-hydroxy-decahydroisoquinoline by condensing cyclohexene-(1)-yl-ethylamine with an alkali metal bisulfite addition product of p-methoxy-phenylacetaldehyde in a dilute aqueous medium at a hydrogen ion concentration within the range of about pH 3 to about pH 4, converting this condensation product to 1-p-methoxybenzyl-N-methyl-10-hydroxy-decahydroisoquinoline by treatment, while in methanol solution with formaldehyde and hydrogen in the presence of a hydrogenation catalyst, and heating this product with aqueous hydrobromic acid under reflux to yield the desired 3-hydroxy-N-methylmorphinane.

5. As a new chemical compound, a substance chosen from the group consisting of 1-p-alkoxybenzyl-10-hydroxy-decahydroisoquinoline, 1-p-alkoxybenzyl-7-methyl-10-hydroxy-decahydroisoquinoline, 1-p-alkoxybenzyl-10-hydroxy-N-methyl-decahydroisoquinoline, and 1-p-alkoxybenzyl-10-hydroxy-N:7-dimethyl-decahydroisoquinoline.

6. As a new chemical compound, 1-p-alkoxybenzyl-10-hydroxy-decahydroisoquinoline.

7. As a new chemical compound, 1-p-methoxybenzyl-10-hydroxy-decahydroisoquinoline.

8. As a new chemical compound, 1-p-alkoxybenzyl-7-methyl-10-hydroxy-decahydroisoquinoline.

9. As a new chemical compound, 1-p-methoxybenzyl-7-methyl-10-hydroxy-decahydroisoquinoline.

10. As a new chemical compound, 1-p-alkoxybenzyl-10-hydroxy-N-methyl-decahydroisoquinoline.

11. As a new chemical compound, 1-p-methoxybenzyl-10-hydroxy-N-methyl-decahydroisoquinoline.

12. As a new chemical compound, 1-p-alkoxybenzyl-10-hydroxy-N:7-dimethyl-decahydroisoquinoline.

References Cited in the file of this patent

UNITED STATES PATENTS

| | | |
|---|---|---|
| 2,634,292 | Hellerback | Apr. 7, 1953 |
| 2,651,637 | Henecka | Sept. 8, 1953 |

OTHER REFERENCES

Grewe et al., Berichte Deusch. Chem. Gesol., vol. 81, pp. 279–86 (1948).